United States Patent [19]

Manning

[11] Patent Number: 4,974,649
[45] Date of Patent: Dec. 4, 1990

[54] TOOTH AND HOLDER ASSEMBLY FOR A STUMP CUTTING MACHINE

[76] Inventor: Ronald Manning, 1129 Linwood Ave., Washington Township, N.J. 07675

[21] Appl. No.: 537,158

[22] Filed: Jun. 12, 1990

Related U.S. Application Data

[63] Continuation of Ser. No. 443,885, Nov. 28, 1989, abandoned.

[51] Int. Cl.[5] .............. B27G 13/04; B27C 1/00; B27C 9/00
[52] U.S. Cl. .................... 144/235; 37/2 R; 144/2 N; 144/241; 299/91
[58] Field of Search .............. 407/118; 299/91, 92; 37/2 R; 144/2 N, 218, 241, 233, 234, 235

[56] References Cited

U.S. PATENT DOCUMENTS

| | | | |
|---|---|---|---|
| 3,797,544 | 3/1974 | Ver Ploeg | 144/235 |
| 3,935,887 | 2/1976 | VanZante et al. | 144/235 |
| 4,480,874 | 11/1984 | Shaw | 299/91 |
| 4,759,394 | 7/1988 | Clemenson | 144/2 N |

FOREIGN PATENT DOCUMENTS

996007  8/1976  Canada .............. 144/2 N

*Primary Examiner*—W. Donald Bray
*Attorney, Agent, or Firm*—W. Patrick Quast

[57] ABSTRACT

A stump cutting machine having an improved tooth and holder assembly for use in removing tree stumps. This machine has a rotatable circular blade supported by journal members. The improved cutting assemblies, each have a pair of teeth and a pair of tooth holders. Each tooth has a head portion for cutting, and a shank portion fixedly connected to the holder. The holder is fixedly connected to the blade. The head portion has a collar portion, an arch portion, and a shoulder portion. The collar portion includes a carbide tip with a front inclined surface. The arch portion includes a rear cutting face with a selected angle. The arch portion extends from the tip portion to the shoulder portion, which bears against the holder. The holder has a surface which faces the circular blade and which has a slot. The slot receives the tooth shank portion. The blade and holder are connected by bolts which apply opposite clamping forces on the shank portion. The shank portion has a rear step portion, which backs up the shoulder of the tooth head portion. The shank portion extends beyond the back of the holder assembly; and has a tapered dimension extending back from the arch portion to the end of the shank portion. The holder and tooth have complementing machine surfaces, which provide for a relatively snug fit.

8 Claims, 4 Drawing Sheets

TOOTH AND HOLDER ASSEMBLY FOR A STUMP CUTTING MACHINE

This is a continuation of application Ser. No. 7/443,885 filed Nov. 28, 1989 and now abandoned.

The invention relates to a tooth and holder assembly for a stump cutting machine and in particular, the invention relates to a tooth and holder assembly which has improved resistance to bending moments and shear forces.

BACKGROUND OF THE INVENTION

A prior art stump cutting machine is described in U.S. Pat. No. 2,912,022. A prior art stump cutting tooth structure is described in U.S. Pat. No. 4,759,394, issued July 26, 1988 to Lyle J. Clemson. The prior art stump cutting structure machine includes a rotatable circular blade having a plurality of tooth and holder assemblies mounted on the blade at the periphery thereof, each tooth and holder assembly including a tooth holder mounted at one side of the circular blade adjacent to the periphery, said holder having a flat face held parallel against said blade, said face of said holder having a slot therein radially of said blade, a cutting tooth having a shank portion and a cutting head portion, said head portion having a carbide cutting tip, said shank portion being disposed in said holder slot, being held against said blade by opposite clamping forces, said tooth head portion extending outwardly of said slot and radially of said blade, said head portion being angled transversely of said shank portion outwardly of said slot, and said head portion being twisted axially of said shank portion.

One problem with the prior art stump cutting tooth structure is that excess stress, due to shear load, bending moments and torsion moments, have caused failure at the region of the tooth where the shank portion joins the head portion. A second problem is the fracturing of the tooth holders and holder bolts during operation. A third problem can develop at impact as the head portion of the tooth is twisted axially. Shear loading transverse to the plane of the shank portion often occurs which can result in the loss of the carbide tip.

A fourth problem involves the difficulty in removing prior art teeth from the holder assembly, especially after use.

Still another problem occurs due to the presence of moment loads resulting from the angled carbide tip portion of the tooth. These moment loads can cause the tooth to dislodge from the holder.

SUMMARY OF THE INVENTION

According to the present invention, an improved tooth and holder cutting assembly for a stump cutting machine is provided. This machine comprises a power driven, rotatable, circular blade having an axis of rotation and having a shaft supported by journal members, the blade having a plurality of cutting assemblies, each having a pair of teeth and a pair of tooth holders, each side of which is positioned on opposite sides of the blade adjacent to the periphery and disposed at equal spacing around the perimeter of the blade. Each holder and tooth assembly including a tooth holder mounted at one side of the circular blade, said holder having a flat face parallel to said blade, said face of the holder having a slot therein radially of said blade; a cutting tooth having a shank portion and a cutting head portion, said head portion having a carbide tip, said shank portion being disposed in said holder slot and extending beyond the rear of the holder, said holders being held against said blade by opposite clamping forces, said tooth head portion extending outwardly of said slot and radially of said blade, said tooth head portion being arched above said carbide tip and radially back towards said tooth shank portion and said holder slot, and said tooth head portion being arched radially below said carbide tip back towards said tooth shank portion and said holder slot and parallel to side of said blade to form a collar portion for said tooth. The invention further comprising said tooth shank having a step or raised portion, said holder having a raised slot to correspond to said step in said tooth shank; and a flat face surface perpendicular to said slot, to provide support for a corresponding tooth shoulder surface.

By using a tooth shoulder surface portion constructed above the carbide tip and by having that shoulder surface disposed against the holder surface, shearing forces on the tooth are transmitted to the holder. Stress due to torsion moment on the shank portion is minimized so that tooth shearing failures are significantly reduced. By using a tooth shoulder surface constructed above the carbide tip and having that shoulder surface disposed against the holder surface, momentary bending or flexing is eliminated preventing the dislodgment of the carbide tip. By extending the tooth shank position beyond the rear of holder slot, tooth extraction is made easier. By using a tooth collar portion constructed below the carbide tip partially concealing said carbide tip, the latter is secured to a better degree. By using a tooth collar portion constructed below the carbide tip partially protecting it, certain wear factors are reduced.

The improvement further comprises the tooth shank having a slightly wedged-shaped, shank portion, the wider portion being towards the rear of the holder assembly, such that dislodgment of the tooth during use is inhibited.

The foregoing and other objects, features and advantages will be apparent from the following description of the preferred embodiment of the invention as illustrated in the accompanying drawings.

DESCRIPTION OF THE PREFERRED EMBODIMENT

Figure 1:
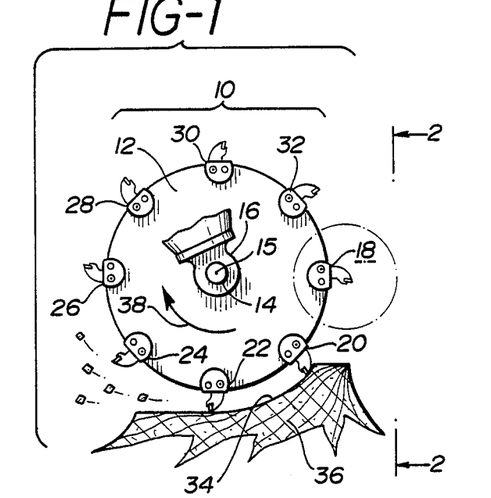
FIG. 1 is an elevation view of the stump cutting blade of a stump cutting machine according to the invention.
Figure 2:
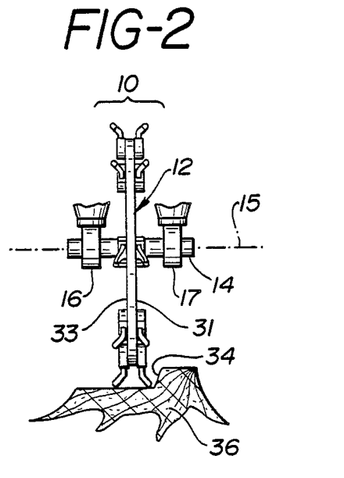
FIG. 2 is a section view as taken along line 2—2 of FIG. 1.

As shown in FIGS. 1 and 2, a stump cutting machine 10 is depicted. Machine 10 includes a circular plate or blade 12, a shaft 14 with an axis 15 on which blade 12 is journaled, and a first near bearing 16 and a second far bearing 17 on which a shaft 14 is journaled. Machine 10 has other parts, which are conventional and which are not shown for ease of illustration.

As shown in FIGS. 1 and 2, blade 12 has a plurality of equally spaced holders and tooth assemblies 18, 20, 22, 24, 26, 28, 30, 32. Blade 12 in combination with holder and tooth assemblies 18-32 is used to cut a groove 34 through a stump 36. Blade 12 has a rotary motion direction 38.

Figure 3:
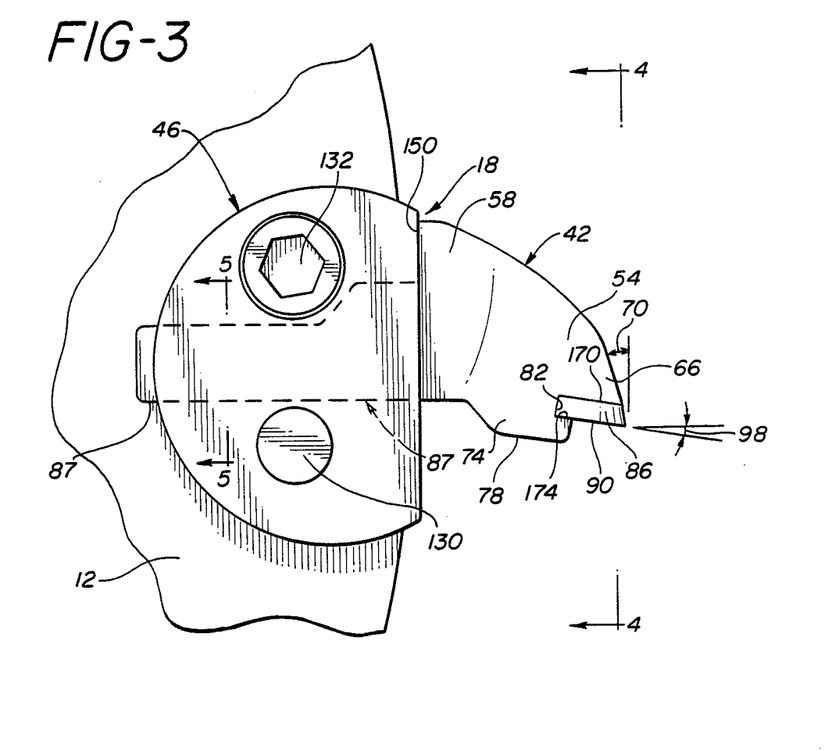
FIG. 3 is an enlarged detail view of a portion of FIG. 1.
Figure 4:
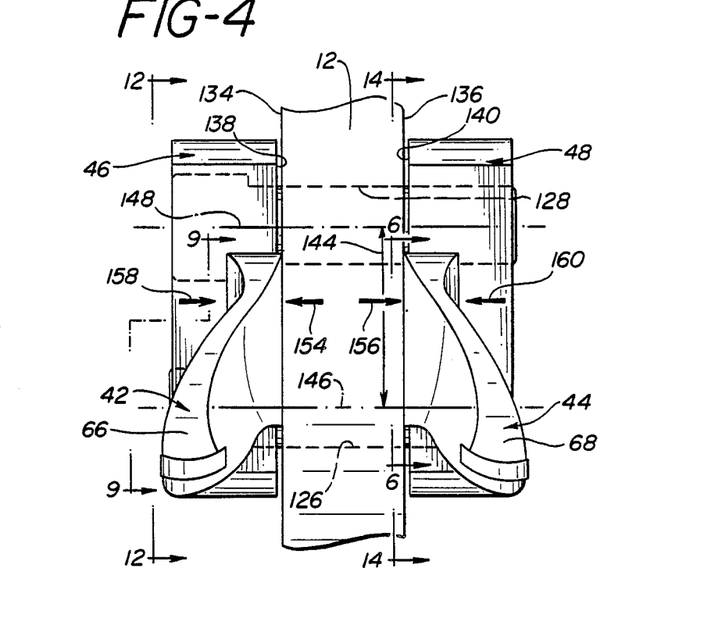
FIG. 4 is a section view as taken along line 4—4 of FIG. 3.
Figure 5:
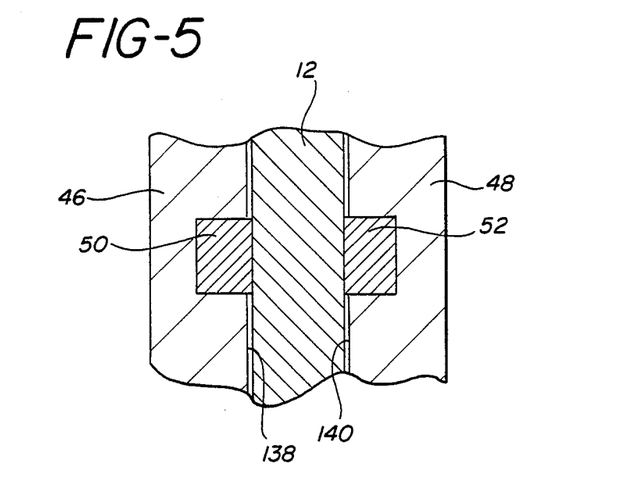
FIG. 5 is a section view as taken along line 5—5 of FIG. 3.

As shown in FIGS. 3 and 4, assembly 18 is identical in construction to assemblies 20, 22, 24, 26, 28, 30, and 32. Assembly 18 includes a first near tooth 42, a second far tooth 44, a first near holder 46 and a second far holder 48. Tooth 44 is identical to, but opposite hand to tooth 42. Holder 48 is substantially identical to but opposite hand to holder 46. Holder 46 supports tooth 42. Holder 48 supports tooth 44. However, tooth 44 can be mounted in holder 46 for certain applications; and tooth 42 can be mounted in holder 48 for certain applications.

As shown in FIGS. 3, 6, 7, 9 and 10, tooth 42 and tooth 44 have respective shank portions 50, 52, and have respective head portions 54, 56. Head portions 54, 56 have respective shoulder portions 58, 60, with respective shoulder surfaces 59, 61. Shanks 50, 52 include respective axially extending portions 51 and 53. Shanks 50, 52 are tapered having narrow dimensions 205, 207 which are typically ½ inches and wide dimensions 208, 210, which are typically 17/32 inches. Shanks 50, 52 have respective step or wedge portions 62, 64, which back up respective shoulder portions 58, 60. Heads 54, 56 have respective arch portions 66, 68 including rear cutting faces 66a, 68a, which have respective arch angles 70, 72. The head portions, 54 and 56, extend a distance, 71 and 73, of approximately 1 9/16 inch ahead of shoulder surface 59 and 61. A portion of shanks 50 and 52 extend beyond the rear of the holder which facilitates their removal at replacement (See FIG. 3).

Heads 54, 56 also have respective front, inclined collar portions 74, 76, which have inclined collar surfaces 78, 80. Portions 74, 76 have respective recesses 82, 84 which receive respective carbide tips 86, 88. These are silver soldered to the tooth body at surfaces 174, 176; 82, 84; and 170, 172. Tips 86, 88 have respective tip surfaces 90, 92.

As shown in FIGS. 3, 6, 7, 9 and 10, axially extending portions 51 and 53 of shank (50–52), have respective bottom surfaces 87, 89 and respective top surfaces 91, 93. As mentioned above shanks 50, 52 have respective step portions 62, 64 which have respective first surfaces 63, 65 and respective incline surfaces 67, 69. Shanks 50, 52 have respective centerlines 94, 96. Shank surfaces 87, 89, 91, 93, and 63, 65, are parallel to a plane passing perpendicular into the plane of the drawings through centerlines 94, 96. Tip surfaces 90, 92 are in a plane which is inclined to a plane through centerlines 94, 96. Tip surfaces 90, 92 have respective inclination angles 98, 100.

As shown in FIGS. 12, 13, 14, and 15, holders 46, 48 have respective slots 102, 104, which have respective bottom surfaces 106, 108 and top surfaces 110, 112. Top surfaces 110, 112 include respective first surfaces 115, 117; respective inclined surface parts 114, 116; and step portion top surfaces 107, 109. Surfaces 106, 107, 108, 109, 115 and 117 are parallel to a plane passing perpendicular into the plane of the drawing through slot centerlines, 111 and 113 respectively. Holders have respective shoulder face surfaces 150, 152, which are in a plane perpendicular to said plane passing through said centerline.

As shown in FIGS. 12, 13, 14 and 15, holders 46, 48 have respective lower holes 118, 120 with respective centerlines 139, 141; and respective upper holes 122, 124, with respective centerlines 143, 145, these being at dimension 144. Blade 12 also has lower and upper through holes 126, 128, with respective centerlines 146, 148, these being at dimension 144. Bolt 130 passes through lower holes 118, 120 and lower hole 126 on blade 12. Bolt 132 passes through upper holes 122, 124, in respective holders 46, 48 and upper hole 128 in blade 12. Holes 120 and 122 are counterbored to accept heads for bolts 130 and 132, so that, they are flush with the surface of the particular holder, outboard from the corresponding blade surface. Holes 118 and 124 are threaded to accept the shank end of their respective bolts.

Referring to FIGS. 3 and 4, blade 12 has blade surfaces 134, 136. Holders 46, 48 have respective faces 138, 140, which contain respective slots 102, 104. Teeth 42, 44, being disposed in slots 102, 104, it follows that through the tightening action of bolts 130, 132, clamping forces 154, 156 are applied by blade surface 134, 136; and clamping forces 158, 160 are applied by slot surfaces 162, 164 to shanks 50, 52 thus securing them to the blade. These same clamping forces operate on the tapered shafts, 50, 52, thus restraining the axial movement of the tooth in response to various forces which would otherwise tend to dislodge it from the holder.

The cutting tooth of the prior art (U.S. Pat. No. 4,759,394) is fabricated using as a starting point a cutting bit presently utilized in the coal mining industry and manufactured by the Border City Tool and Manufacturing Co. of Warren, Mich. Border City Tool and Manufacturing Co. markets the bit as their model BCT 1.

The improved bit as described hereinafter, is drop forged in the configuration delineated, using 4140 carbon steel. After drop forging, machining, and bending, the assembly is heat treated, after which the carbide tips are assembled.

Figures 6, 8:
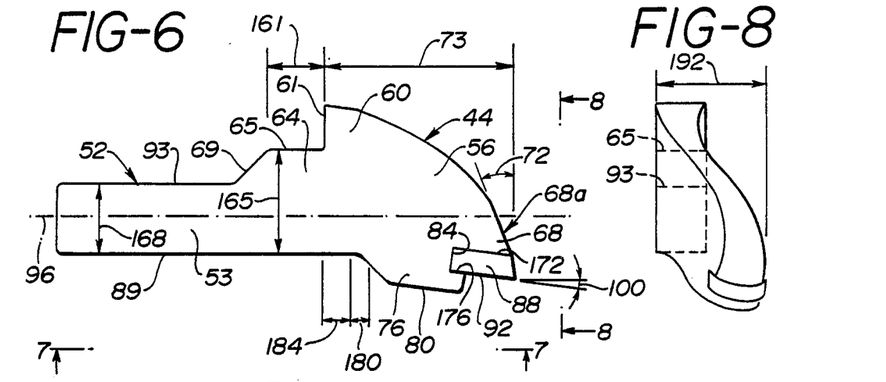
FIG. 6 is a section view as taken along line 6—6 of FIG. 4.
FIG. 8 is a section view as taken along line 8—8 of FIG. 6.
Figures 7, 9:
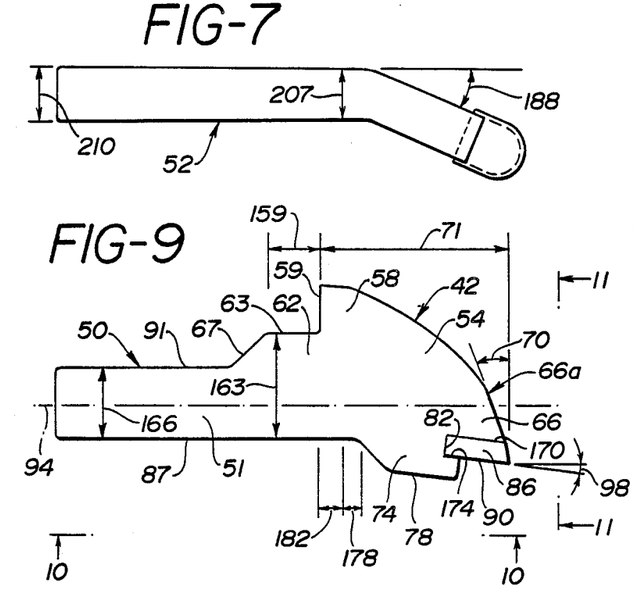
FIG. 7 is a section view as taken along line 7—7 of FIG. 6.
FIG. 9 is a section view as taken along line 9—9 of FIG. 4.
Figure 10:
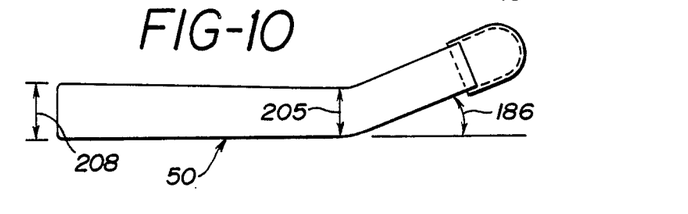
FIG. 10 is a section view as taken along line 10—10 of FIG. 9.
Figure 11:
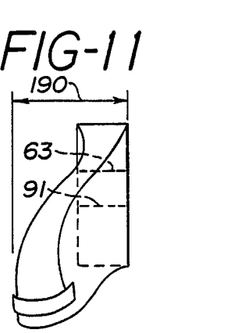
FIG. 11 is a section view as taken along line 11—11 of FIG. 9.
Figure 12:
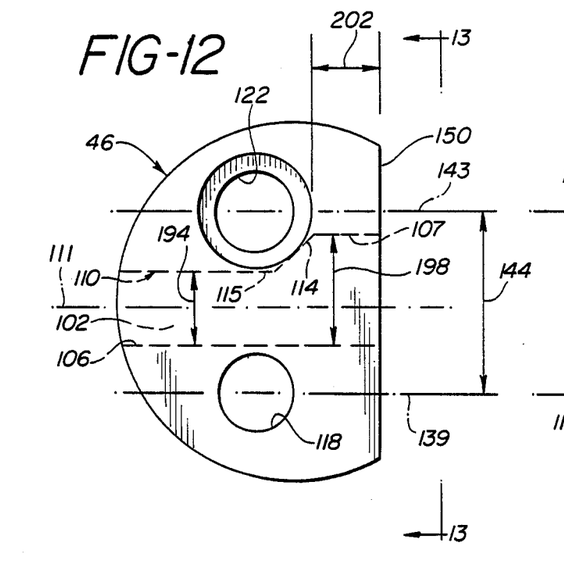
FIG. 12 is a section view as taken along line 12—12 of FIG. 4, with the tooth member removed.
Figure 13:
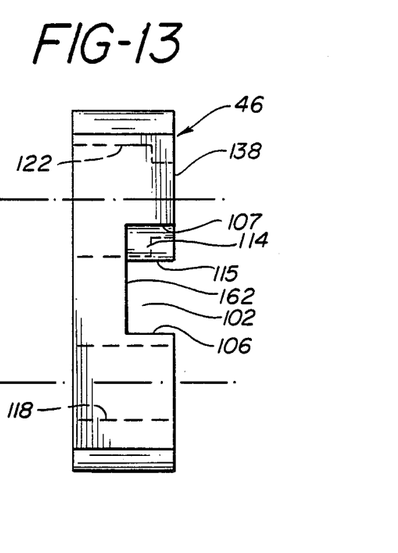
FIG. 13 is a section view as taken along line 13—13 of FIG. 12.
Figure 14:
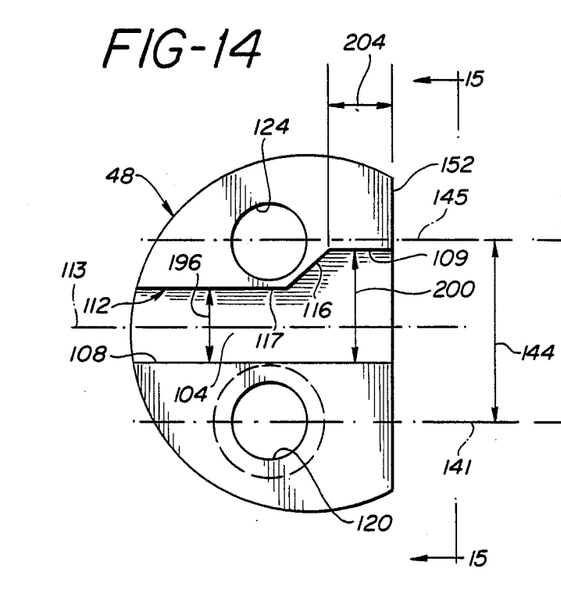
FIG. 14 is a section view as taken along line 14—14 of FIG. 4, with the tooth member removed.
Figure 15:
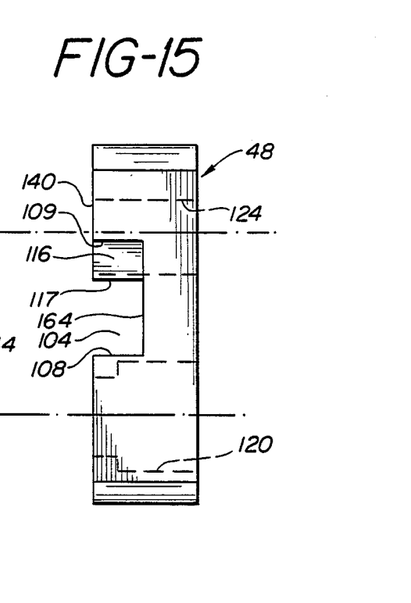
FIG. 15 is a section view as taken along line 15—15 of FIG. 14.

Starting with the basic forging for the tooth as provided, machining steps are performed on the tooth to provide the appropriately sized surfaces. So for example, shoulder surfaces 59 and 61 are machined such that their vertical height as viewed in FIGS. 6 and 9 are ½ inch. Inclined surfaces 67 and 69 begin on step portion first surface 63 and 65 at a point behind shoulder surfaces 59 and 61 at dimension 159, 161 respectively, again at ½ inch. The angle of inclination of surface 67 and 69 typically is 45 degrees. The top surfaces of shank 50 and 52 are forged such that the overall vertical heights 166 and 168, of the shank portion 50 and 52 are typically ⅝ of an inch. The overall vertical heights 163-165 of shank portion 62 and 64, are typically machined to 15/16 of an inch.

In the area of the carbide tip, the angle of inclination of the carbide tip support surface 170 and 172 as depicted at 98 and 100 is typically 15 degrees off the horizontal. The lower surfaces 174 and 176 of recesses 82 and 84 are cut at typically 3/16 inch above inclined collar surfaces 78 and 80.

Referring to FIGS. 6 through 10, head portions 54 and 56 are angled transversely of their respective shank portions, 50 and 52. The zone, 178 and 180, where the bending of the tooth is accomplished is positioned ahead of shoulder surface 59 and 61. This zone extends approximately 3/16 of an inch creating a radius bend; and is positioned at a distance 182 and 184, which is approximately 3/8 of an inch ahead of shoulder surface 59 and 61. The angular deviation, 186 and 188, from the plane containing shank portions 50 and 52, is approximately 30 degrees. After the angling is accomplished, the width, 190 and 192, of the improved tooth is approximately 1 and 3/16 inch.

Although there is depicted left and right handed, angled teeth, it is to be understood that in certain applications, a straight tooth is desirable. The dimensions of that variation are substantially identical to those for the angled teeth; except that there is no bending of the head portion out of the plane of the shank portion.

FIGS. 12, 13, 14 and 15, again, depict the holder for the tooth. It is typically made of 1018, or other carbon steel. Slots 102 and 104 are generally configured in a complementing fashion to accommodate the outline of the shank portion of the tooth including the first and inclined surfaces of the step portion, e.g. 65 and 69.

In order to provide a relatively snug fit, the dimension, 194, 196, of the height of the slots in the holders is fabricated to within 0.005 to 0.010 inches of the height, 166 and 168, of the teeth. So also, holder dimensions 198 and 200, are fabricated to within 0.005 to 0.010 inches of the complementary section of the tooth (dimensions 163,165). The complementary sections of the holder slot corresponding to the step portion first holder surfaces, 107 and 109, have dimensions, 202 and 204, which are somewhat larger than that for tooth surfaces, 63 and 65, so for example, where, as noted above, 63 and 65, extend ½ inch from surfaces 59 and 61 to the start of inclined surfaces, 67 and 69, the dimensions, 202 and 204, for the corresponding surface of the holder slots are each 9/16 of an inch. Shoulder face surfaces 150 and 152 of holders 46, 48 extend at least ½ inch above the slot openings to provide full support for tooth shoulder surfaces, 59 and 61.

ADVANTAGES

The advantages of machine 10 are indicated hereafter:

(a) a tooth cutting face arch angles 70, 72 are relatively small (in the range typically of 15 TO 20 degrees, but preferably 20 degrees) and tooth head portions 54, 56 have relatively enlarged arches for transferring bending moments and shear loads to sections at shoulders 58, 60 having respective surfaces 59, 61 which, are held against respective holders 46, 48 at respective surfaces 150, 152. Surfaces 59, 61, 150, and 152 are machined surfaces which maximize the contact between the two sets of surfaces resulting in the transfer of bending moments and shear loads to the holders 46, 48 thus minimizing stress failures at head portions 54, 56.

(b) shear stresses and bending stresses are minimized by tooth step portions 62, 64 which back up shoulders 58, 60;

(c) tooth step portions 62, 64 help to strengthen shanks 50, 52 when inserted into slots 102, 104, so that shank bottom surfaces 87, 89 bear evenly on slot bottom surfaces 106,108 and so that the largest stress forces are borne by the heaviest shank portions;

(d) front inclined collar portions 74, 76 protect the carbide tips 86, 88 against impact forces from metal objects, stones, and the like, for longer carbide tip life;

(e) the intentional tapering of shank portions 50, 52, (dimensions 208, 210 to dimensions 205, 207) ensure optimum clamping of the tooth by restraining movement along axes 111, 113, thereby resisting various forces which otherwise tend to dislodge the tooth from the holder.

(f) front inclined collar portions 74, 76 help to protect carbide tips 86, 88 against compression "pop-off" at contact, i.e., the dislodgement of the carbided tip from the tooth;

(g) front inclined collar portions 74, 76 provide a slot or recessed surface (82,-84), into which carbide 88 is silver soldered, thereby securing it from below, (surface 174, 176), as well as rear (surface 82, 84), and above (surface 170, 172), thus securing the carbide tips 86, 88 against certain shear stresses;

(h) front inclined collar portions 74, 76 are an enlarged area of the tooth which allow more metal to combat certain wear factors at this portion of the tooth, thus extending tooth life;

(i) holder dimension 198, 200, allows insertion of tooth with larger shank dimension 163, 165 as described in (c) above;

(j) holder surface 150, 152 allows for exact mating of tooth shoulder surfaces 59, 61 for transmittal of bending moments and shear loads on teeth 42, 44 to holder 46, 48;

(k) the extension of a portion of the shank 50 or 52 beyond the rear of the corresponding holder facilitates removal of the teeth at replacement.

While a preferred embodiment of the improved tooth and holder assembly has been described, other modifications thereto can be made without departing from the scope of the invention which is encompassed by the claims which follow.

What is claimed is:

1. An improved tooth and holder assembly for a stump cutting machine having a rotatable blade including an axis of rotation and having first and second axially spaced blade surfaces, the assembly comprising:
   (a) a tooth holder mounted on the first blade surface adjacent the periphery of the blade;
   said holder having a flat face facing said first blade surface;
   said face of said holder having a slot therein disposed radially of said blade, said slot having a slot wall disposed parallel to the first blade surface;
   (b) a cutting tooth having a shank portion and a cutting head portion;
   said shank portion being disposed in said slot;
   said head portion extending radially outwardly of said slot and of said blade;
   said head portion having a collar portion;
   said head portion having a shoulder portion and having an arch portion including a cutting face surface disposed between the collar portion and the shoulder portion said shoulder portion including a shoulder surface;
   said holder having a shoulder face surface;

said collar portion having a front inclined collar surface and, including a cutting tip;

said shank portion including an axially extending portion and a step portion;

said slot configured in design to complement said shank portion including said axially extending portion and said step portion;

the axially extending portion of said shank portion tapered from a first dimension nearer the shoulder surface of said head shoulder portion to a second, larger dimension at the opposite end of said axially extending portion;

said tooth disposed in said slot such that the shoulder surface of said head shoulder portion contacts the shoulder face surface of said holder; and (c) means for clamping the tooth and holder assembly to the blade;

whereby the contacting of said shoulder surface of said head shoulder portion with the shoulder face surface of said holder and the complementing slot and shank portion design permit transmittal of bending moments and shear loads on said tooth to said holder; and, whereby the tapering of said shank portion from said first dimension to said second dimension eliminates axial movement of said tooth in said slot during the stump cutting process.

2. An improved tooth and holder assembly for a stump cutting machine having a rotatable blade including an axis of rotation and having first and second axially spaced blade surfaces, the assembly comprising:

(a) a first and second tooth holder mounted on the first and second blade surface, respectively, adjacent the periphery of the blade;

each said holder having a flat face facing a respective one of said first and second blade surfaces;

each said flat face of said corresponding holder having a slot therein disposed radially of said blade, said slot having a slot wall disposed parallel to the corresponding blade surface;

(b) a first and second cutting tooth each having a shank portion and a cutting head portion;

each said shank portion being disposed in a corresponding one of said slots;

each said head portion extending radially outwardly of said corresponding slot and of said blade;

each said head portion having a collar portion;

each said head portion having a shoulder portion and having an arch portion including a cutting face surface, disposed between the collar portion and the shoulder portion said shoulder portion including a shoulder surface;

each said holder having a shoulder face surface;

each said collar portion having a front inclined collar surface and, including a cutting tip;

each said shank portion including an axially extending portion and a step portion;

each said slot configured in design to complement said respective shank portion including said axially extending portion and said respective step portion;

each said axially extending portion of said respective shank portion tapered from a first dimension nearer the respective shoulder surface of said respective head shoulder portion to a second, larger dimension at the opposite end of said axially extending portion;

each said tooth disposed in said respective slot such that the shoulder surface of said respective head shoulder portion contacts the shoulder face surface of said respective holder; and (c) means for clamping each said tooth and holder assembly to the blade;

whereby the contacting of said shoulder surface of each said head shoulder portion with the respective shoulder face surface of each said holder and the respective complementing slot and shank portion designs permit transmittal of bending moments and shear loads on each said tooth to each said holder; and, whereby the tapering of each said shank portion from said first dimension to said second dimension eliminates axial movement of each said tooth in each said slot during the stump cutting process.

3. An improved tooth and holder assembly for a stump cutting machine having a rotatable blade including an axis of rotation and having first and second axially spaced blade surfaces, the assembly comprising:

(a) a tooth holder mounted on the first blade surface adjacent the periphery of the blade;

said holder having a flat face facing said first blade surface;

said face of said holder having a slot therein disposed radially of said blade, said slot having a slot wall disposed parallel to the first blade surface;

(b) a cutting tooth having a shank portion and a cutting head portion;

said shank portion being disposed in said slot;

said head portion extending radially outwardly of said slot and of said blade;

said head portion having a collar portion;

said head portion having a shoulder portion and having an arch portion including a cutting face surface disposed between the collar portion and the shoulder portion said shoulder portion including a shoulder surface;

said holder having a shoulder face surface;

said collar portion having a front inclined colar surface and, including a cutting tip;

said shank portion including an axially extending portion and a step portion;

said slot configured in design to complement said shank portion including said axially extending portion and said step portion;

said tooth disposed in said slot such that the shoulder surface of said shoulder portion contacts the shoulder face surface of said holder;

(c) means for clamping the tooth and holder assembly to the blade;

whereby the contacting of said shoulder surface of said head shoulder portion with the shoulder face surface of said holder and the complementing slot and shank portion design permit transmittal of bending moments and shear loads on said tooth to said holder; and, (d) means for restraining axial movement of said tooth in said slot during the stump cutting process.

4. An improved tooth and holder assembly for a stump cutting machine having a rotatable blade including an axis of rotation and having first and second axially spaced blade surface, the assembly comprising:

(a) a first and second tooth holder mounted on the first and second blade surface, respectively, adjacent the periphery of the blade;

each said holder having a flat face facing a respective one of said first and second blade surfaces;

each said flat face of said corresponding holder having a slot therein disposed radially of said blade, said slot having a slot wall disposed parallel to the corresponding blade surface;

(b) a first and second cutting tooth having a shank portion and a cutting head portion;

each said shank portion being disposed in a corresponding one of said slots;

each said head portion extending radially outwardly of said corresponding slot and of said blade;

each said head portion having a collar portion;

each said head portion having a shoulder portion and having an arch portion including a cutting face surface, disposed between the collar portion and the shoulder portion said shoulder portion including a shoulder surface;

each said holder having a shoulder face surface;

each said collar portion having a front inclined collar surface and, including a cutting tip;

each said shank portion including an axially extending portion and a step portion;

each said slot configured in design to complement said respective shank portion including said axially extending portion and said respective step portion;

each said tooth disposed in said respective slot such that the shoulder surface of said respective head shoulder portion contacts the shoulder face surface of said respective holder;

(c) means for clamping each said tooth and holder assembly to the blade;

whereby the contacting of said shoulder surface of each said head shoulder portion with the respective shoulder face surface of each said holder and the respective complementing slot and shank portion designs permit transmittal of bending moments and shear loads on each said tooth to each said holder; and, (d) means for restraining axial movement of each said tooth in each said slot during the stump cutting procedure.

5. The improved tooth and holder assembly claimed in either claim 1 or claim 3 wherein said portion is angled in a first direction axially away from one of said blade surfaces.

6. The improved tooth and holder assembly of either claim 1, 2, 3 or 4 wherein each said cutting face has a respective arch angle of 20 degrees.

7. The improved tooth and holder assembly of either claim 1, 2, 3 or 4 wherein each said axially extending portion of each said shank portion extends beyond the rear of the respective holder.

8. The improved tooth and holder assembly claimed in either claim 1, 2, 3 or 4 wherein each said collar portion includes an enlarged portion below said cutting tip whereby said carbide tip is protected and whereby the respective tooth life is extended.

* * * * *

UNITED STATES PATENT AND TRADEMARK OFFICE
CERTIFICATE OF CORRECTION

PATENT NO. : 4,974,649
DATED : December 4, 1990
INVENTOR(S) : Ronald Manning

It is certified that error appears in the above-identified patent and that said Letters Patent is hereby corrected as shown below:

IN THE CLAIMS: At Column 8, line 45 change "colar" to --collar--

At Column 8, line 68, change "surface" to --surfaces--.

Signed and Sealed this

Twenty-third Day of June, 1992

Attest:

DOUGLAS B. COMER

*Attesting Officer*     *Acting Commissioner of Patents and Trademarks*